United States Patent
Chang et al.

(10) Patent No.: US 7,559,686 B2
(45) Date of Patent: Jul. 14, 2009

(54) LAMP-FIXING DEVICE AND BACKLIGHT MODULE USING THE SAME

(75) Inventors: Shao-Han Chang, Tu-cheng (TW); Hua-Dong Zou, Shenzhen (CN); Yu-Ya Liu, Shenzhen (CN); Li-Zhou Shi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 158 days.

(21) Appl. No.: 11/518,795

(22) Filed: Sep. 11, 2006

(65) Prior Publication Data

US 2007/0171636 A1     Jul. 26, 2007

(30) Foreign Application Priority Data

Jan. 21, 2006   (CN)   .................... 2006 1 0033243

(51) Int. Cl.
*H01R 33/02*   (2006.01)
*H01R 33/90*   (2006.01)

(52) U.S. Cl. .................. 362/652; 362/97; 362/655; 362/656; 349/70; 439/235

(58) Field of Classification Search .................. 362/97, 362/652, 655, 656; 349/70; 439/235
See application file for complete search history.

(56) References Cited

U.S. PATENT DOCUMENTS

| | | | | |
|---|---|---|---|---|
| 2,909,756 A * | 10/1959 | Sitz | ............ | 439/721 |
| 3,333,228 A * | 7/1967 | Ege | ............ | 439/239 |
| 4,210,379 A * | 7/1980 | Vachhani et al. | ............ | 439/406 |
| 4,918,582 A * | 4/1990 | McIngvale et al. | ............ | 362/217 |
| 5,283,674 A * | 2/1994 | Hanaoka et al. | ............ | 349/67 |
| 5,486,983 A * | 1/1996 | Cordier et al. | ............ | 362/29 |
| 5,907,218 A * | 5/1999 | Altman et al. | ............ | 315/56 |
| 6,135,620 A * | 10/2000 | Marsh | ............ | 362/377 |
| 6,905,224 B2 * | 6/2005 | Yoo et al. | ............ | 362/225 |
| 7,086,775 B2 * | 8/2006 | Huang et al. | ............ | 362/652 |
| 7,104,671 B2 * | 9/2006 | Tseng et al. | ............ | 362/224 |
| 7,278,754 B2 * | 10/2007 | Kim et al. | ............ | 362/225 |
| 2004/0008512 A1 | 1/2004 | Kim | | |
| 2005/0013134 A1 | 1/2005 | Yoo et al. | | |
| 2005/0083675 A1 * | 4/2005 | Huang et al. | ............ | 362/31 |

FOREIGN PATENT DOCUMENTS

CN       1538218 A       10/2004

* cited by examiner

*Primary Examiner*—Ismael Negron

(57) ABSTRACT

A lamp-fixing device includes a base and at least one receiving unit. The receiving unit is formed on the base. The receiving unit includes two opposite protruding walls extending perpendicular out from the base. The two protruding walls and the base cooperatively define a receiving space used to receive one end of a lamp tube with an electrode holder. The two protruding walls and the base each define a heat dissipation hole therein of the receiving space.

16 Claims, 6 Drawing Sheets

LAMP-FIXING DEVICE AND BACKLIGHT MODULE USING THE SAME

TECHNICAL FIELD

The present invention relates to lamp-fixing devices and backlight modules using the same, more particularly, to direct type backlight modules for use in, for example, a liquid crystal display (LCD).

BACKGROUND

In a liquid crystal display device, liquid crystal is a substance that does not itself illuminate light. Instead, the liquid crystal relies on reflecting light from a light source, thereby displaying images and data. In the case of a typical liquid crystal display device, a backlight module powered by electricity supplies the needed light.

Generally, backlight modules can be classified into an edge lighting type or a bottom lighting type based upon the location of lamps within the device. The edge lighting type backlight module has a lamp unit arranged at a side portion of a light guiding plate that guides light. The edge lighting type backlight modules are commonly employed in small-sized LCD due to their lightweight, small size, and low electric consumption. However, the edge lighting type backlight modules are not suitable for large-sized LCD (20 inches or more). A bottom lighting type backlight module has a plurality of lamps arranged in regular positions to directly illuminate an entire surface of an LCD panel. The bottom lighting type backlight modules have higher efficiency of light usage and longer operational lifetime than the edge lighting type backlight modules, the bottom lighting type backlight modules are especially used in large-sized LCD devices. However, an LCD device usually employs a significant amount of lamps to reach a high luminance. The significant amount of lamps results in a great deal of heat produced and cumulated inside the LCD device. Therefore, heat dissipation of the direct type backlight modules is usually a hard nut to crack.

Referring to FIG. 5, a typical lamp-fixing device 10 used for fixing lamp tubes in backlight module is shown. The lamp-fixing device 10 includes two same side-plates 11, a number of fixing holes 111, and a number of heat dissipation holes 112. The fixing holes 111 are aligned in each side-plate 11, and are used for receiving ends of lamp tubes 12. The heat dissipation holes 112 are defined in each side-plate 11 adjacent to the fixing holes 111. The two side plates 11 are disposed apart, and collectively fixing the two ends of the lamp tubes 12.

However, because the ends of the lamp tubes 12 are hold in the fixing holes 111, heat substantially produced from the ends of the lamp tubes 12 is not easily dissipated, even though the heat dissipation holes 112 are defined aside the fixing holes 111. In addition, dust may pass through the heat dissipation holes 112 to adhere to the surface of lamp tubes 12 or to optical sheets (not shown) and disposes thereon, thus deteriorating the brightness of the backlight module using the lamp-fixing device 10. Furthermore, because the ends of the light tubes 12 are inserted into side-plates 11, the lamp-fixing device 10 and the lamp tubes 12 need to be disassembled whenever any lamp tubes 12 are damaged. Disassembling the lamp-fixing device 10 is very troublesome and also increases the risk of damaging other good lamp tubes 12 of the lamp-fixing device 10.

What is needed, therefore, is a lamp-fixing device and a backlight module using the same that overcome the above mentioned disadvantage.

SUMMARY

A lamp-fixing device according to a preferred embodiment includes a base and a plurality of receiving units. The receiving units are formed and aligned apart on the base. Each receiving unit includes two opposite protruding walls extending perpendicular out from the base. The two protruding walls and the base cooperatively define a receiving space used to receive one end of a lamp tube with an electrode holder. The two protruding walls cooperatively fix the electrode holder and the lamp tube. The two protruding walls and the base respectively define therein a heat dissipation hole in communication with the receiving space.

A backlight module according to a preferred embodiment includes a reflective plate, at least two lamp-fixing devices and a plurality of lamp tubes. The same lamp-fixing device as described in the previous paragraph is employed in this embodiment. The reflective plate has two opposite ends. The two lamp-fixing devices are respectively fixed on the two opposite ends of the reflective plate. Two ends of the lamp tube are respectively mounted into a receiving unit of the two lamp-fixing devices.

Other advantages and novel features will become more apparent from the following detailed description of the preferred embodiments, when taken in conjunction with the accompanying drawings.

BRIEF DESCRIPTION OF THE DRAWINGS

Many aspects of the lamp-fixing device and backlight module using the same can be better understood with reference to the following drawings. The components in the drawings are not necessarily drawn to scale, the emphasis instead being placed upon clearly illustrating the principles of the present lamp-fixing device and backlight module using the same. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present lamp-fixing device and backlight module using the same, in detail.

Figure 1:
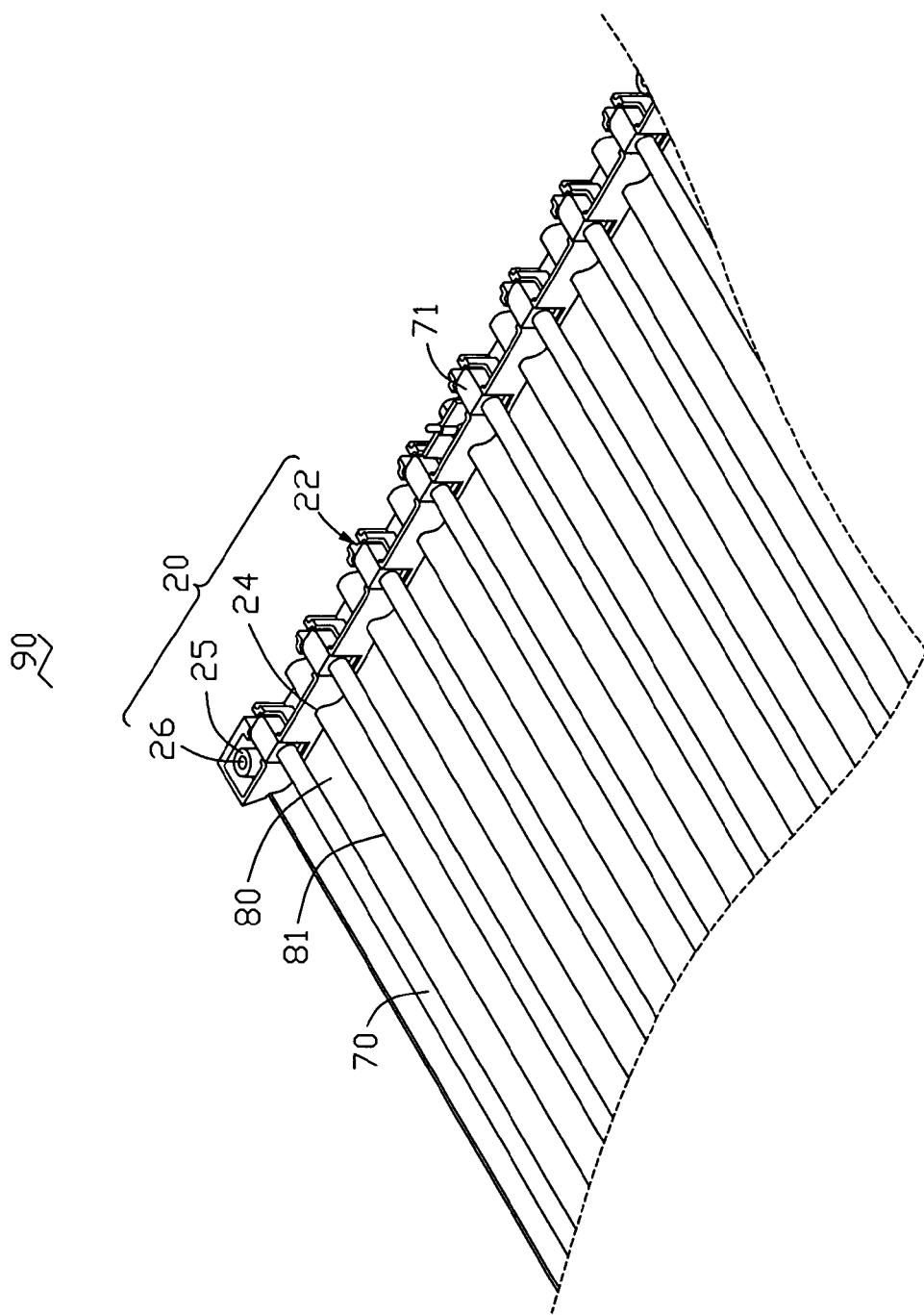
FIG. 1 is a schematic, partially isometric view of a backlight module employing two lamp-fixing devices according to a first preferred embodiment.
Figure 6:
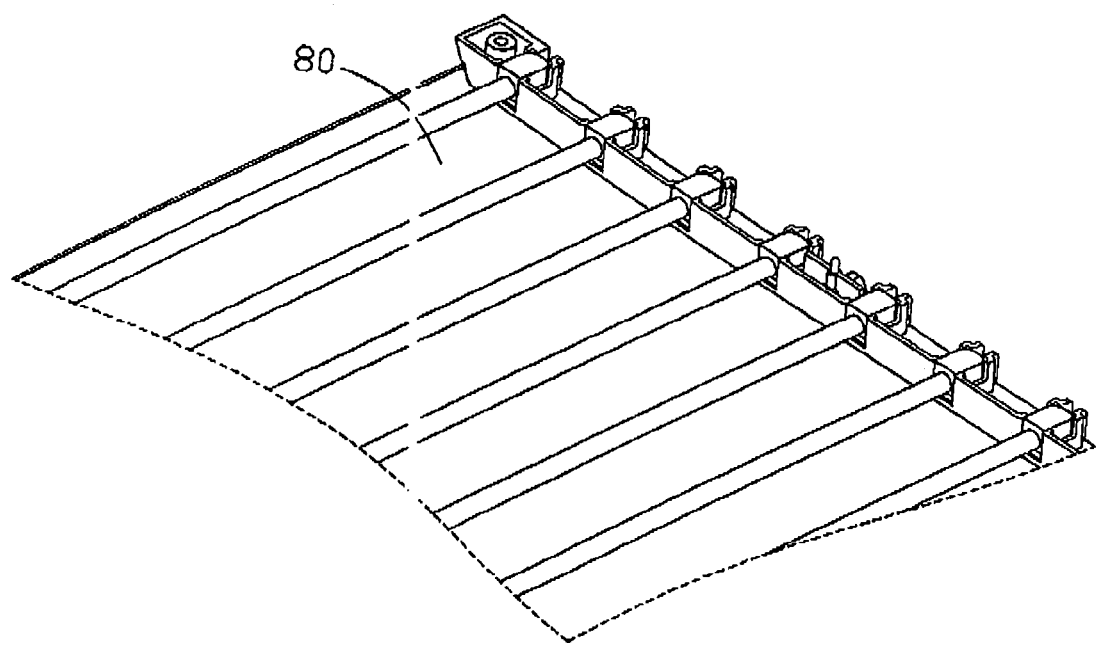
FIG. 6 is a schematic, partially isometric view os a backlight module employing two lamp-fixing devices according to a third preferred embodiment.

Referring to FIG. 1, a backlight module 90 in accordance with a first preferred embodiment is shown. The backlight module 90 includes at least two lamp-fixing devices 20, a plurality of lamp tubes 70, and a reflective plate 80. The reflective plate 80 may be either a flat plate or a curved plate having a number of protrusions. The reflective plate SO is used to reflect light from the lamp tubes 70 onto a liquid crystal panel (not shown) positioned on the lamp-fixing devices 20. In this embodiment, the reflective plate 80 is a curved plate having a number of elongated protrusions 81 extending along a direction parallel to a side surface thereof. In an alternative embodiment, referring to FIG. 6. the reflective plate 80 is a flat plate. The reflective plate 80 has two opposite ends corresponding to the ends of the protrusions 81. The two lamp-fixing devices 20 are separately fixed on the two opposite ends of the reflective plate 80. Two ends of each lamp tube 70 are correspondingly inserted into two electrode holders 71, so as to protect electrodes of each lamp tube 70. Electrode holders 71 inserted with the two ends of each lamp tube 70 are correspondingly mounted into the two lamp-fixing devices. Each lamp tube 70 is aligned above the reflective plate 80 between the two adjacent protrusions 81. In this embodiment, the lamp tubes 70 employ cold cathode fluorescent lamps.

Figure 2:
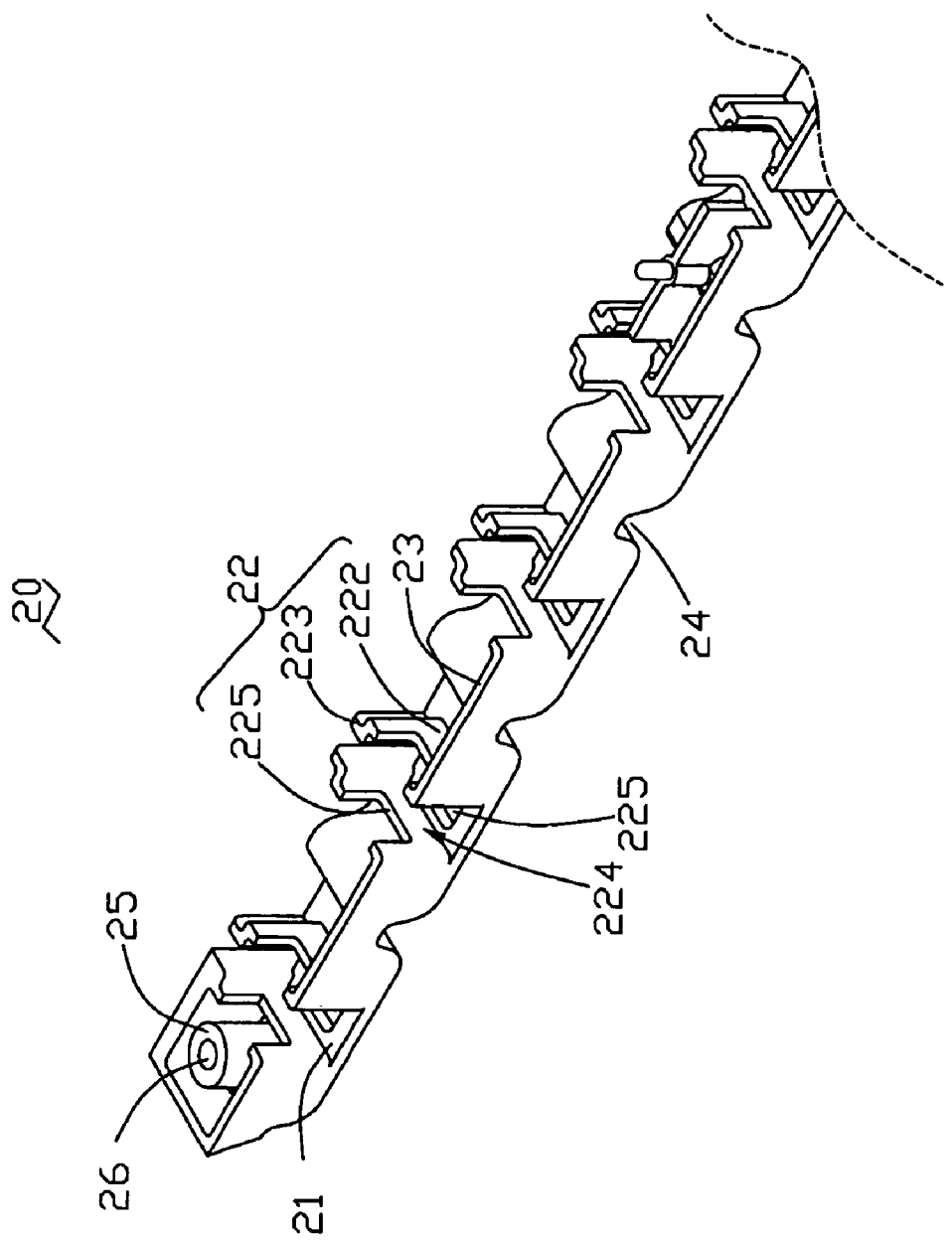
FIG. 2 is a schematic, partially isometric view of the lamp-fixing device shown in FIG. 1.

Also referring to FIG. 2, each lamp-fixing device 20 includes a base 21 and a plurality of receiving units 22. The base 21 is an elongated sheet. The receiving units 22 are aligned at predetermined intervals on the base 21. Each receiving unit 22 includes two opposite protruding walls 222 extending perpendicularly out of the base 21, parallel to the protrusions 81. The two protruding walls 222 and the base 21 cooperatively define a receiving space 224, used for receiving the electrode holder 71 inserted with one end of the lamp tube 70. The two protruding walls 222 and the base 21 each define a heat dissipation hole 225 therein, in communication with the receiving space 224. The heat dissipation holes 225 may be rectangular or circular in shape, or of other suitable shapes. In this embodiment, the heat dissipation holes 225 are rectangular.

In this embodiment, each receiving unit 22 further includes two bent portions 223, each extending from one end of the protruding wall towards an inner area of the receiving space 224. The two bent portions 223 are used to help fix the electrode holder 71 tightly. The two bent portions 223 cooperatively define a narrow opening therebetween, for precisely drawing out a lead wire connecting an electrode of the lamp tube through the electrode holder therealong.

In this embodiment, in order to match with the protrusions 81 of the reflective plate 80, the base 21 defines a plurality of arcuate recesses 24 corresponding to the protrusions 81 between the two adjacent receiving units 22. In addition, the lamp-fixing device 20 further includes a plurality of sidewalls 23 formed between the two adjacent receiving units 22. Each sidewall 23 is connected with corresponding ends of the two protruding walls 222 of the two adjacent receiving units 22 facing the bent portions 223 of the protruding walls 222. The sidewalls 23 are configured for improving a mechanical intensity of the lamp-fixing devices 20. Each lamp-fixing device 20 further includes two screw posts 25 and two screw holes 26. The two screw posts 25 are correspondingly positioned at two ends of the base 21. The two screw holes 26 are defined in the two screw posts 25 correspondingly. The screw posts 25 and the screw holes 26 are configured for fixing the lamp-fixing device 20 to the base 21.

When the ends of the lamp tubes 70 are inserted into corresponding receiving units 22 of the lamp-fixing device 20, heat substantially produced of the ends of the lamp tubes 70 could be easily dissipated through the heat dissipation holes 225 of the receiving space 224. In addition, the ends of the lamp tubes 70 with the electrode holders 71 is partially surrounded by the receiving units 22, this also results in that heat may not be substantially accumulated within the receiving space 224 and can be dissipated efficiently. Furthermore, when any lamp tubes 70 are damaged, the damaged lamp tubes 70 can be easily taken out from the receiving unit 22 independently. This embodiment avoids disassembling the whole lamp-fixing device 20 with the all lamp tubes 70.

It is to be understood that at least one of the two protruding walls 222 and the first base defining therein only one heat dissipation hole 225 in communication with the receiving space 224, should be considered to be in the scope of the present lamp-fixing device.

Figure 3:
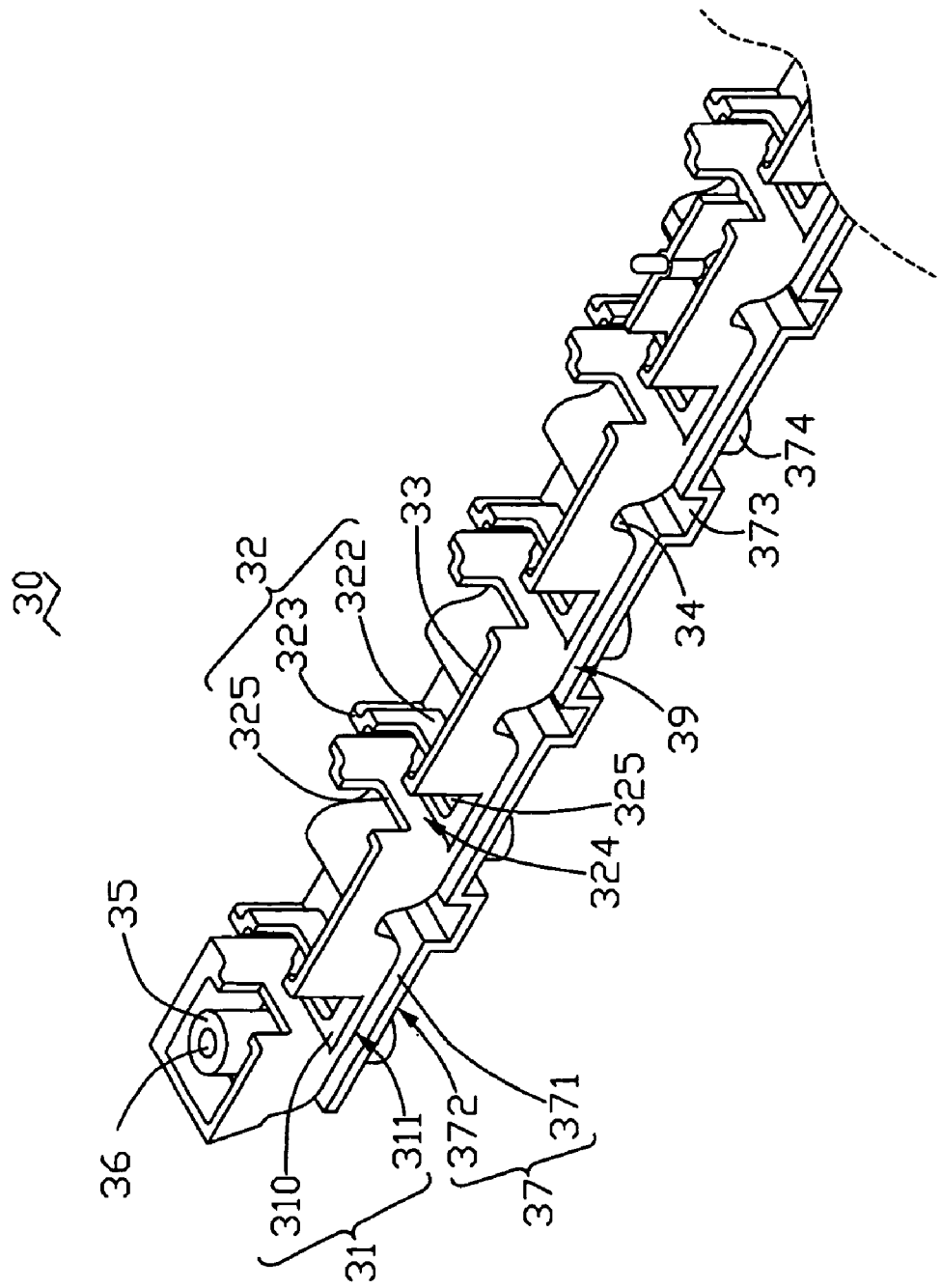
FIG. 3 is a schematic, isometric view of a lamp-fixing device according to a second preferred embodiment.
Figure 4:
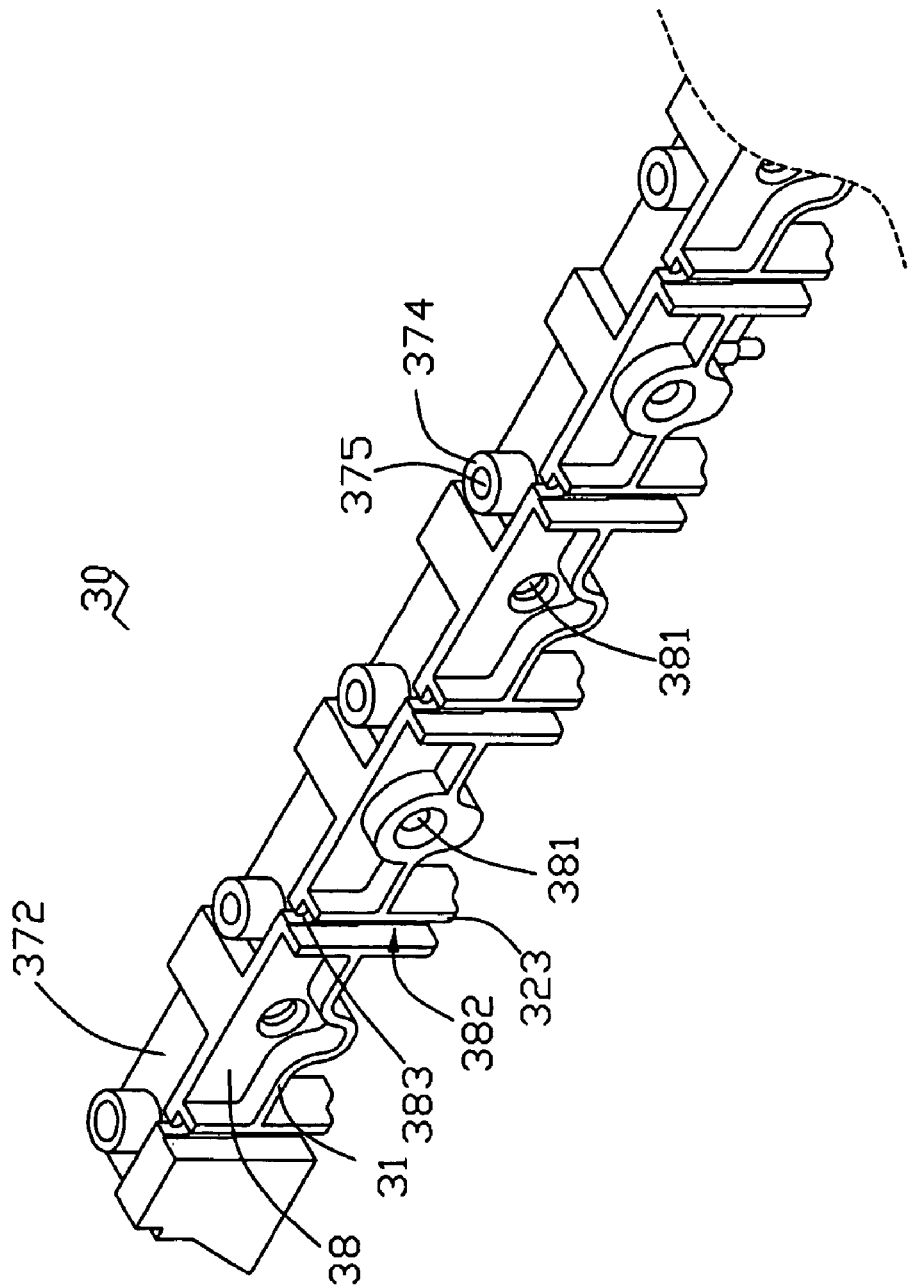
FIG. 4 is a schematic, opposite isometric view of the lamp-fixing device of FIG. 3.
Figure 5:
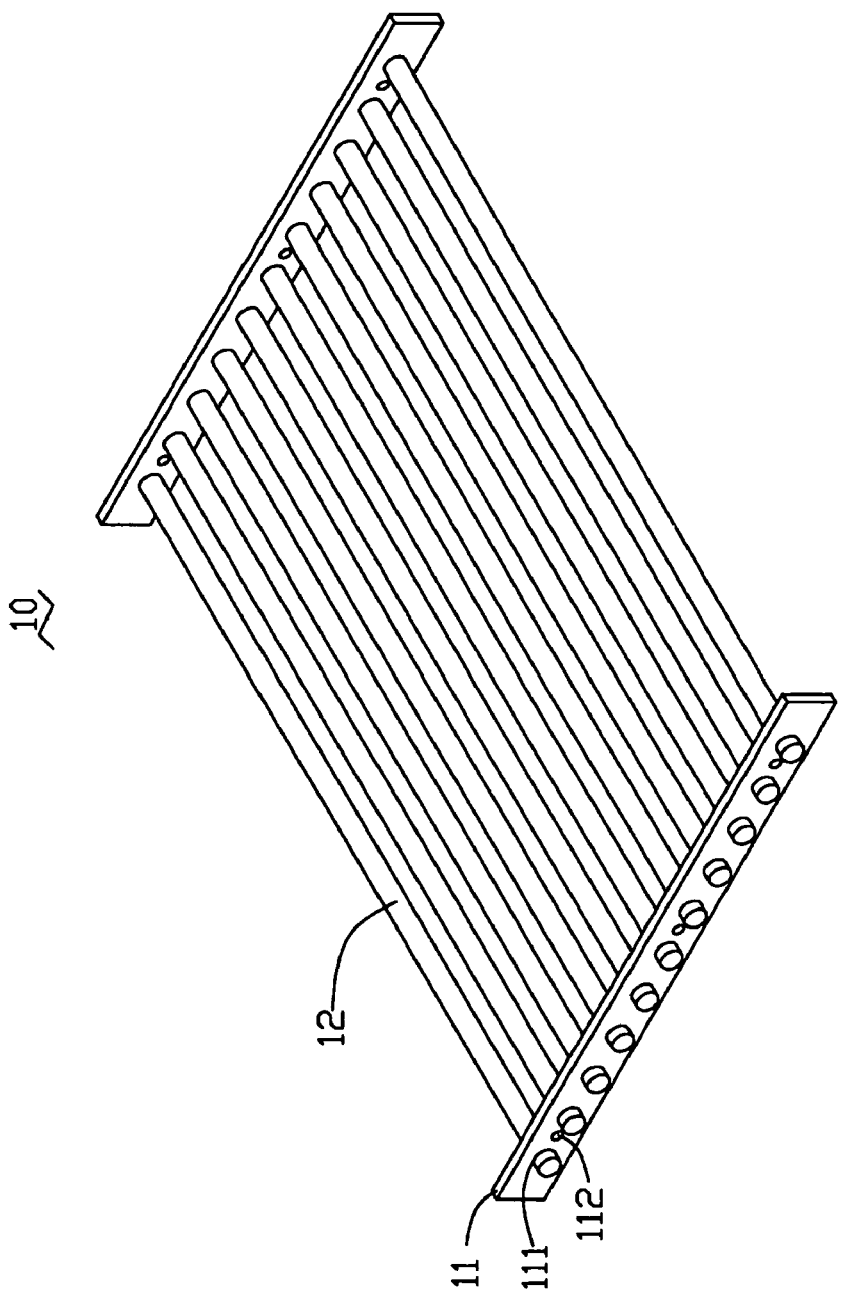
FIG. 5 is a schematic, isometric view of a conventional lamp-fixing device fixing a plurality of lamp tubes.

Referring to FIGS. 3 and 4, a lamp-fixing device 30 in accordance with a second preferred embodiment is shown. The lamp-fixing device 30 includes a first base 31, a number of receiving units 32, a number of sidewalls 33, a connecting sheet 38, and a second base 39. The first base 31 includes an upper surface 310 and a bottom surface 311 opposite to the upper surface 310. The receiving units 32 are aligned at predetermined intervals on the upper surface 310 of the first base 31. Each receiving unit 32 includes two opposite protruding walls 322 extending parallel to each other and perpendicular out of the upper surface 310 of the first base 31, and further includes two bent portions 323 each extending from one end of the protruding wall towards inner area between the two protruding walls 322. The two protruding walls 322 and the first base 310 cooperatively define a receiving space 324 used to receive one end of a lamp tube (not shown) inserted with an electrode holder (not shown). The two protruding walls 322 and the first base 310 respectively define a heat dissipation hole 325 in the receiving space 324. The first base 31 defines a plurality of arcuate recesses 34 between the two adjacent receiving units 32. Each sidewall 33 is connected with ends of the two protruding walls 322 of the two adjacent receiving units 32.

The lamp-fixing device 30 is similar in principle to the lamp-fixing device 20, except that the lamp-fixing device 30 further includes the connecting sheet 38 and the second base 39. The second base 39 is positioned under the first base 31, aligned with the first base 31. The connecting sheet 38 extends out from an edge of the bottom surface 310 of the first base 31 perpendicularly, and connects with the second base 39. The first and second bases 31 and 39, and the connecting sheet 38 cooperatively define a similar U-shaped channel (not labeled) therebetween, thus, one end of the reflecting plate could be inserted into the U-shaped channel.

The connecting sheet 38 defines a plurality of screw holes 381 therein corresponding to the arcuate recesses 34 of the first base 31. Two bent portions 323 of each receiving unit 32 extend throughout the connecting sheet 38 to define a number of guiding slots 382 at an outer surface of the connecting sheet 38. Each guiding slot 382 is used to position a wire connecting the electrode of the lamp tubes therealong. Each guiding slot 382 defines a cutout 383 at one end thereof adjacent to the second base 39, configured for fixing the wire tightly and neatly.

The second base 39 defines a plurality of rectangular recesses 373 therein according to the arcuate recesses 34 of the first base 31. The second base 39 defines a plurality of screw posts 374 at an outer surface thereof. Each screw post 374 defines a screw hole 375 therein. The lamp-fixing device 30 can be fixed on a base having a plurality of second screw holes according to the screw holes 375 by a number of screws.

It is to be understood that the present backlight module may further include at least one optical sheet, such as a light diffusion sheet, a prism sheet, and/or a brightness enhancement film stacked above the lamp tubes, used for improving an optical uniformity. Field emission linear lamps, or other linear light sources may also be used as lamp tubes in the present backlight module.

It should be pointed out that the structure the present lamp-fixing device is not limited to the illustrated embodiment. The lamp-fixing unit, i.e. without the structures such as sidewalls 23 or 33, recesses 24 or 34, should be considered to be within the scope of the present invention.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A lamp-fixing device comprising:
a first base;
a plurality of receiving units formed and aligned apart on the first base, each receiving unit having two opposite protruding walls extending perpendicular out from the first base, the two protruding walls and the first base cooperatively defining a receiving space for receiving one end of a lamp tube with an electrode holder, the two protruding walls cooperatively fixing the electrode holder and the lamp tube;
wherein at least one of the two protruding walls and the first base define a heat dissipation hole in communication with the receiving space, and the first base has a plurality of recesses defined between the two adjacent receiving units.

2. The lamp-fixing device according to claim 1, wherein each of the receiving units further comprises two bent portions, each of the two bent portions extending from one end of the protruding walls towards an inner area of the receiving space.

3. The lamp-fixing device according to claim 1, further comprising a plurality of sidewalls defined between the two adjacent receiving units, each sidewall being connected with one corresponding end of the two protruding walls of the two adjacent receiving units.

4. The lamp-fixing device according to claim 1, further comprising two screw posts and two screw holes, the two screw posts being correspondingly positioned at two ends of the first base, the two screw holes being defined in the two screw posts correspondingly.

5. The lamp-fixing device according to claim 1, wherein the heat dissipation hole is rectangular, or circular.

6. The lamp-fixing device according to claim 1, further comprising a connecting sheet and a second base, the second base being positioned under the first base, aligned with the first base, and the connecting sheet extending out from an edge of a bottom surface of the first base perpendicularly, and connecting with the second base.

7. The lamp-fixing device according to claim 6, wherein the lamp-fixing device comprises a plurality of receiving units aligned at predetermined intervals on the first base, the first base defining a plurality of recesses between the two adjacent receiving units; and the connecting sheet defines a plurality of screw holes therein corresponding to the recesses of the first base.

8. The lamp-fixing device according to claim 6, wherein the receiving unit further comprises two bent portions respectively each extending from one end of the protruding wall towards an inner area of the receiving space; and two bent portions each extends throughout the connecting sheet to define a guiding slot at an outer surface of the connecting sheet.

9. The lamp-fixing device according to claim 8, wherein each guiding slot defines a cutout at one end thereof adjacent to the second base.

10. A backlight module comprising:
a reflective plate having two opposite ends;
a pair of lamp-fixing devices fixed on the two opposite ends of the reflective plate respectively, each lamp-fixing device having a first base, a plurality of receiving units formed and aligned apart on the first base, each of the receiving units having two opposed protruding walls extending perpendicularly out from the first base, the two protruding walls and the base cooperatively defining a receiving space, the two protruding walls cooperatively fixing the electrode holder and the lamp tube, wherein at least one of the two protruding walls and the first base define therein a heat dissipation hole in communication with the receiving space; and
a plurality of lamp tubes, two ends of each of the lamp tubes being respectively mounted into the receiving units of the two lamp-fixing devices, wherein the reflective plate is a curved plate having a number of protrusions extending along a direction parallel to a side surface thereof; each lamp-fixing device comprises a plurality of receiving units aligned at predetermined intervals on the first base, the first base defining a plurality of recesses between the two adjacent receiving units corresponding to the protrusions; and the pair of lamp-fixing device are disposed on the two ends of the protrusions of the first base.

11. The backlight module according to claim 10, wherein each lamp-fixing device further comprises a plurality of sidewalls defined between the two adjacent receiving units, each sidewall being connected with one end of the two protruding walls of the two adjacent receiving units.

12. The backlight module according to claim 10, wherein each receiving unit further comprises two bent portions respectively extending from one end of the protruding wall towards an inner area of the receiving space.

13. The backlight module according to claim 10, wherein each lamp-fixing device further comprises a plurality of sidewalls defined between the two adjacent receiving units, each sidewall being connected with one end of the two protruding walls of the two adjacent receiving units.

14. The backlight module according to claim 10, wherein each lamp-fixing device further comprises a connecting sheet and a second base, the second base being positioned under the first base, aligned with the first base, and the connecting sheet extending out from a bottom surface of the first base perpendicularly, connecting with the second base; the first and second bases, and the connecting sheet cooperatively define a U-shaped channel therebetween, so as to insert one end of the reflecting plate into the similar U-shaped channel.

15. The backlight module according to claim 14, wherein each receiving unit of the lamp-fixing device further comprises two bent portions each extending from one end of the protruding wall towards an inner area of the receiving space; and two bent portions each extends throughout the connecting sheet to define a guiding slot at an outer surface of the connecting sheet.

16. The backlight module according to claim 15, wherein each guiding slot defines a cutout at one end thereof adjacent to the second base.

* * * * *